United States Patent [19]
Speers et al.

[11] 3,796,370
[45] Mar. 12, 1974

[54] COMBINATION DRINKING STRAW AND WHEEL SPOKE COVER

[75] Inventors: Samuel F. Speers, North Attleboro; David F. Stewart, North Reading; Henry J. Leboda, Burlington; Michael E. Quattrochi, Acton, all of Mass.

[73] Assignee: Hasbro Industries, Inc., Pawtucket, R.I. ; by said Speers

[22] Filed: Dec. 27, 1972

[21] Appl. No.: 318,722

[52] U.S. Cl............................... 239/33, 301/37 SA
[51] Int. Cl.............................................. A47g 21/18
[58] Field of Search ........... 138/128, 156, 157, 170, 138/151; 229/51 TS, 93; 239/33; 46/1 R; 301/37 SA

[56] References Cited
UNITED STATES PATENTS

| | | | |
|---|---|---|---|
| 2,997,043 | 8/1961 | Flynn | 220/53 UX |
| 990,658 | 4/1911 | Kunpf | 138/128 |
| 777,771 | 12/1904 | Bettis | 220/93 |
| 2,408,253 | 9/1946 | Diebold | 138/128 X |
| 3,346,187 | 10/1967 | Mueller | 239/33 |
| 3,612,612 | 10/1971 | Gannon | 301/37 SA |

Primary Examiner—M. Henson Wood, Jr.
Assistant Examiner—John J. Love
Attorney, Agent, or Firm—Salter & Michaelson

[57] ABSTRACT

A combination drinking straw and wheel spoke cover comprising an elongated, open-ended tubular body of flexible plastic having an elongated tear strip extending longitudinally from end to end, whereby prior to removal of said tear strip the article may be used as a drinking straw, whereas after removal of the tear strip a longitudinal slit is exposed that permits the body to be snapped over a wheel spoke to provide an ornamental cover for same.

8 Claims, 6 Drawing Figures

PATENTED MAR 12 1974 3,796,370
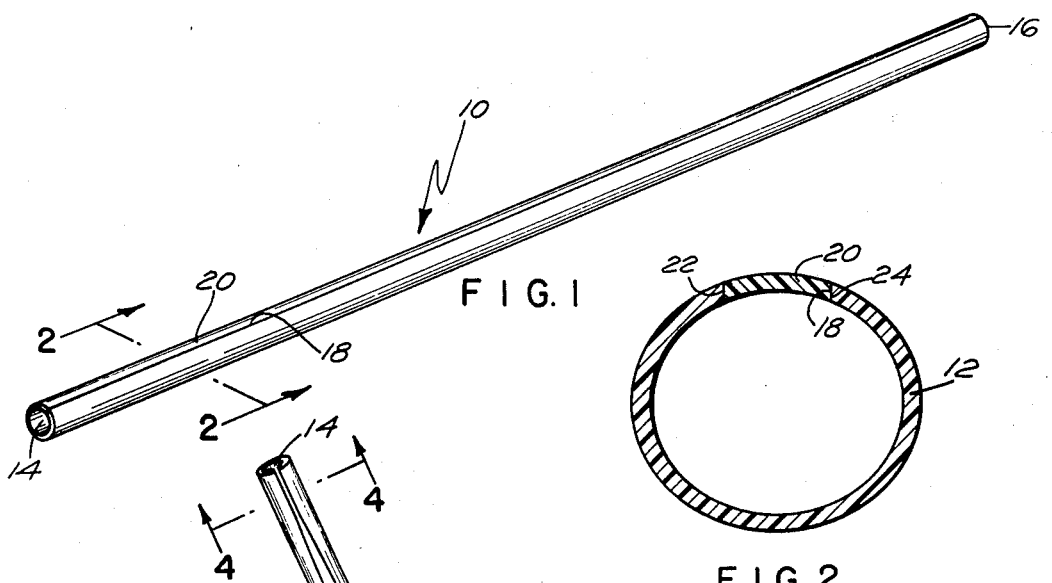
FIG.1
FIG.2
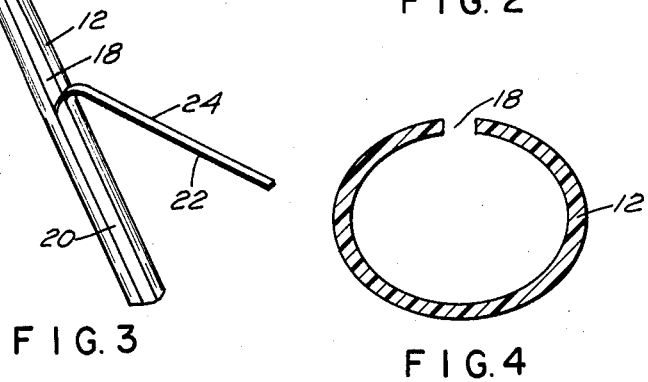
FIG.3
FIG.4
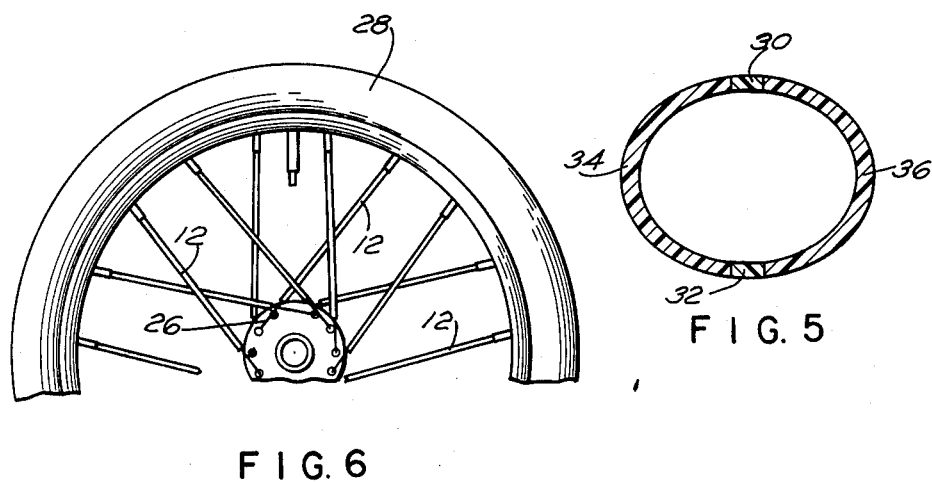
FIG.6
FIG.5

COMBINATION DRINKING STRAW AND WHEEL SPOKE COVER

BACKGROUND AND SUMMARY OF THE INVENTION

The provision of elongated tubular members, having a longitudinal slit extending from end to end for permitting said members to be snapped on to the wheel spoke of a bicycle or the like for ornamental and decorative purposes, is known in the art, as illustrated, for example, by U.S. Pat. No. 3,612,612 issued Oct. 12, 1971.

The present invention is concerned generally with spoke covers of this nature, but is particularly directed to the provision of a drinking straw which, after use, may be readily and easily converted to a wheel spoke cover. Thus, by providing a drinking straw constructed in accordance with the present invention with the aforesaid secondary function, its appeal and hence marketability are greatly increased.

It is therefore a primary object of this invention to provide a drinking straw having a longitudinally extending tear strip, the construction of the straw and tear strip being such that prior to removal of the tear strip the article may effectively function as a drinking straw; and after use as such, the tear strip may be easily removed, thus exposing a longitudinally extending slit which permits the article to be snapped on to a wheel spoke or the like to provide an ornamental cover for same.

By constructing the drinking straw and its tear strip of suitable non-compatible plastic materials, the straw, with its tear strip adhered thereto, may be readily and economically manufactured by conventional dual extrusion means. At the same time, the straw may be gaily colored so as to enhance the appeal of the article, both as a drinking straw and as a wheel spoke cover.

Although the prime use of the invention after it has been used as a drinking straw is as a wheel spoke cover, the invention is obviously not so limited, since the invention could also be used to cover and decorate other wire-like items, such as, for example, wire bicycle baskets and the like, or even car radio antennas, in connection with which the use would not only be decorative, but also would serve as identifying means to permit the car to be more easily located in crowded parking lots, etc.

Other objects, features and advantages of the invention will become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 1 is a perspective view of a drinking straw constructed in accordance with the present invention;

FIG. 2 is a section, on an enlarged scale, taken on line 2—2 of FIG. 1;

FIG. 3 is a fragmentary perspective view showing the straw of FIG. 1 with the tear strip partially removed;

FIG. 4 is a section, on an enlarged scale, taken on line 4—4 of FIG. 3;

FIG. 5 is a sectional view of a slightly modified form of straw construction; and FIG. 6 is a fragmentary side elevational view of a bicycle wheel or the like with the spoke covers assembled thereon.

DESCRIPTION OF THE INVENTION

Referring to the drawings, and particularly to FIGS. 1 and 2 thereof, there is shown generally at 10 a drinking straw comprising an elongate tubular body 12 open at its opposite ends 14, 16. The body 12 is provided with a longitudinal slit 18 which extends from end to end thereof, and which is covered by an elongated tear strip 20. As will be seen most clearly in FIG. 2, the width of tear strip 20 is substantially less than the circumferential dimension of body 12, although the thickness of tear strip 20 and body 12 are substantially equal, it being noted that the longitudinal edges 22, 24 of tear strip 20 are in aligned, abutting engagement with the opposed longitudinal edges of slit 18.

The body 12 and the tear strip 20 are preferably constructed of non-compatible flexible plastic materials, although the latter could conceivably be of a rigid material. As used herein, the term "non-compatible" refers to plastic materials which will not appreciably fuse or unite with each other during extrusion, although said materials will lightly and releasably adhere to each other as a result of the heat and pressure that is present. For example, in practice, it has been found that the tear strip may be effectively and economically constructed of polypropelene, while the body 12 may be effectively and economically constructed of polyethylene, or one of the polystyrene ABS materials, or of an XT polymer; although, as previously stated, it is only important that the body 12 and tear strip 20 be constructed of any suitable nontoxic, flexible plastic materials which will not unite or fuse with each other under heat and pressure, such as during extruding, but which will nevertheless lightly and releasably adhere or stick to each other.

In the manufacture of the straw 10, it is preferred to simultaneously extrude the body 12 and the tear strip 20, it being understood that separate extrusion dies will be used for the body 12 and the tear strip 20 but that the dies will be so oriented that the composite straw 10 will be produced, all in a manner well known in the art. It will be understood that when the straw 10 is produced by being extruded, the opposed longitudinal edges of the tear strip will be caused to lightly adhere or stick to the opposed longitudinal edges of slit 18 as a result of the heat and pressure employed, although it is important to note that no appreciable fusion between the tear strip 20 and body 12 will take place. The aforesaid physical bond between tear strip 20 and body 12 is sufficient to permit the article 10 to effectively function as a drinking straw; but after such use, the tear strip 20 may be readily and easily removed, as illustrated in FIG. 3, to uncover or expose the slit 18. In accomplishing this, the tear strip 20 may either be manually grasped at one of its ends and then torn away, or else the straw 10 may be compressed or bent sufficiently to commence dislodgement of the tear strip 20, after which it may be readily grasped and torn away. Once the tear strip has been completely removed, the inherent resilience of body 12 will cause the slit 18 to partially close, as illustrated in FIGS. 3 and 4; but being of flexible material, the body 12 may be manipulated to enlarge slit 18 in order to permit the body to be snapped over the spoke of a bicycle wheel, as illustrated in FIG. 6. Specifically, it will be understood that the spokes 26 of wheel 28 receive the covers 12, which are readily and easily mounted on said spokes simply by forcing the spokes through the opening 18, whereupon the cover 12 will in effect snap thereon.

It has also been found that after use as a straw, the article 10 may be applied to or mounted on a wheel spoke or the like simply by aligning and pressing the tear strip 20 against the spoke, which pressure causes the tear strip to break away and the cover 12 to simultaneously snap on to the spoke. This method of mounting has the obvious advantage of eliminating the extra step of first removing the tear strip, while at the same time doing away with any manipulation of the body 12 to enlarge slit 18, as aforedescribed.

In FIG. 5, a slightly modified form of our invention is disclosed, wherein two longitudinal tear strips 30 and 32 are provided on tubular body portions 34, 36. Prior to removal of the tear strips 30, 32, the article shown in FIG. 5 functions as a drinking straw in the same manner as aforedescribed, after which both of the tear strips 30 and 32 are removed, whereupon the inherent resilience of the portions 34 and 36 will cause each of them to curl or assume a generally round configuration in cross section, whereupon a pair of wheel spoke covers are provided from the one drinking straw. In all other respects, the article illustrated in FIG. 5 is similar to the embodiment of FIGS. 1 through 4.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A combination drinking straw and wheel spoke cover, comprising an elongated tubular body of constant configuration throughout its length and completely open at both of its ends, said body having a longitudinal slit extending from end to end thereof, a separate tear strip of substantially the same length as said body releasably adhered to said body and covering said slit, whereby said body may be used as a drinking straw before the tear strip has been removed, and whereby removal of the tear strip permits the body to be snapped over a wheel spoke to cover same.

2. The article of claim 1 further characterized in that said body and said tear strip are constructed of non-compatible plastic materials, said body being flexible.

3. The article of claim 2 further characterized in that said plastic materials are extrudable.

4. The article of claim 3 further characterized in that said tear strip is polypropelene.

5. The article of claim 4 further characterized in that said body is either polyethelene or polystyrene.

6. The article of claim 1 further characterized in that the width of said tear strip is substantially less than the circumferential dimension of said body.

7. The article of claim 6 further characterized in that said tear strip and said body are of substantially the same thickness, with the longitudinal edges of said strip being in aligned, abutting engagement with the opposed longitudinal edges of said slit.

8. The article of claim 1 further characterized in that said body has a pair of diametrically opposed slits, and a pair of tear strips covering same, whereby removal of the tear strips provides a pair of wheel spoke covers.

* * * * *